United States Patent [19]

Sharma et al.

[11] Patent Number: 5,637,637
[45] Date of Patent: Jun. 10, 1997

[54] WATERBORNE COPOLYMERIC COLORANTS

[75] Inventors: Mahendra K. Sharma; Imelda L. Watson, both of Kingsport, Tenn.

[73] Assignee: Eastman Chemical Company, Kingsport, Tenn.

[21] Appl. No.: 497,517

[22] Filed: Jun. 30, 1995

[51] Int. Cl.$^6$ .............................. C08J 3/07; C08K 5/16; C08K 5/36
[52] U.S. Cl. .............................. 524/502; 524/501; 525/59; 525/177; 525/191; 525/192; 525/202; 525/212; 525/445; 525/451; 528/271; 528/274; 528/288; 528/290; 528/302
[58] Field of Search .................. 524/502, 501; 525/59, 177, 191, 192, 202, 212, 445, 451; 528/271, 274, 288, 290, 302

[56] References Cited

U.S. PATENT DOCUMENTS

| | | | |
|---|---|---|---|
| 4,267,306 | 5/1981 | Davis et al. | 528/226 |
| 4,359,570 | 11/1982 | Davis et al. | 528/289 |
| 4,403,092 | 9/1983 | Davis et al. | 528/290 |
| 4,477,635 | 10/1984 | Mitra | 525/437 |
| 4,617,373 | 10/1986 | Pruett et al. | 528/288 |
| 5,043,376 | 8/1991 | Sharma et al. | 524/376 |
| 5,104,913 | 4/1992 | Sharma et al. | 523/339 |
| 5,188,641 | 2/1993 | Parton | 8/647 |
| 5,344,872 | 9/1994 | Debord et al. | 524/513 |

FOREIGN PATENT DOCUMENTS 877402   9/1961   United Kingdom.

OTHER PUBLICATIONS

Derwent Abstract Great Britain 914354 (1970).
Derwent Abstract Great Britain 1,046,751 (1963).
Derwent Abstract Great Britain 1,218,547 (1967).

*Primary Examiner*—James J. Seidleck
*Assistant Examiner*—Duc Truong
*Attorney, Agent, or Firm*—Andrew B. Griffis; Harry J. Gwinnell

[57] ABSTRACT

This invention relates to waterborne copolymeric colorant compositions having a dye covalently bonded in the polymer backbone which is prepared by emulsion polymerization of an alkaline solution of a reactive dye and a vinyl monomer. The waterborne copolymeric colorant compositions are useful in formulating waterborne coatings, paints, inks, and primers in various household, personal care and cosmetic applications.

7 Claims, No Drawings

WATERBORNE COPOLYMERIC COLORANTS

FIELD OF THE INVENTION

This invention relates to waterborne copolymeric colorant compositions having a dye covalently bonded in the polymer backbone which is prepared by emulsion polymerization of an alkaline solution of a reactive dye and a vinyl monomer.

BACKGROUND OF THE INVENTION

In many instances, the method used to bind colorant in a polymer determines the end-use properties of films prepared using the polymer. One of the possibilities to bind colorant with polymer is to react chemically to form a copolymeric colorant. The color polyester compositions using copolymerized anthraquinone colorants are disclosed in U.S. Pat. Nos. 4,267,306, 4,359,570, 4,403,092 and 4,617,373. While the anthraquinone colorants exhibit excellent thermal stability and light fastness, such colorants have the inherent disadvantage of low extinction coefficients and high cost to manufacture.

U.S. Pat. No. 4,477,635 discloses a process for preparing solvent soluble nonextractable copolymeric aminotriarylmethane dye containing polyester, polycarbonate, polyurethane, or polyethyleneimine backbones and incorporating such polymers into resins such as polyvinyl chloride, polyvinylidene chloride and acrylic resins such as poly(methylmethacrylate) etc. by solvent blending techniques. Difficulties are encountered in preparing these copolymeric colored compounds because a noncolored intermediate aromatic amine containing polymer must be prepared and then the aromatic amine moiety in the polymer structure must be converted into the aminotriarylmethane moiety by further reaction with a diaryl ketone in the presence of condensation catalyst such as phosphorous oxychloride in an inert organic solvent.

Attempts to make colored polyester compositions in one step by copolymerizing aminotriarylmethane colorants containing reactive groups have failed because of the thermal instability of the triarylmethane chromophobe. These previously disclosed copolymeric aminotriarylmethane compositions also do not have the requisite thermal stability for use in coloring thermoplastic resins via the more favorable method of melt blending when high temperatures are encountered. These copolymeric colorants are prepared by condensation, polymerization, and are not water-dispersible.

U.S. Pat. Nos. 5,043,376 and 5,104,913 disclose liquid-dispersible colorant compositions prepared by emulsifying water-insoluble copolymeric colorants in the presence of a solvent/or a mixture of solvents and surfactants. The solvent is removed by distillation in order to obtain an aqueous dispersion of the copolymeric colorants. The process requires additional steps to convert water-insoluble copolymeric colorants into water-dispersible form.

U.S. Pat. No. 5,188,641 discloses a process for preparing colored polymer containing repeat units derived from at least one azo dye which is free from water-solubilizing groups and contains at least one polymerizable unsaturated group.

U. K. Patent No. 877,402 discloses a process for preparing colored polymers which are useful as pigments, by copolymerizing azo or anthraquinone dyes containing polymerizable olefinic groups with other unsaturated polymerizable compounds. U.K. Patent Nos. 1,046,751 and 1,218,547 disclose the application of polymerizable dyes containing olefinic groups to textile materials in conjunction with a free radical polymerization initiator with the object of polymerizing the dye on or within the textile fibers. U.K Patent No. 914,354 discloses a process for the simultaneous dyeing and finishing of textiles by applying a colored polymer which has been prepared by the emulsion copolymerization of a dye containing a polymerizable compound, the applied copolymer then being cross-linked.

SUMMARY OF THE INVENTION

The present invention has overcome the problem of binding reactive dyes in the backbone of a polymer to form a polymeric colorant and prevents leaching of the dye. This invention is directed to a waterborne copolymeric colorant composition comprising:

(A) 1 to 30 weight percent of at least one reactive dye in alkaline solution;

(B) 10 to 60 weight percent of at least one vinyl compound which copolymerize with the reactive dye in an alkaline medium to form the copolymeric colorant;

(C) 0.1 to 10 weight percent of at least one anionic or nonionic surfactant;

(D) 0.01 to 0.5 weight percent of an initiator; and (E) 50 to 90 weight percent of water, provided the copolymeric colorant composition has a solids content of 10 to 50 weight percent.

DETAILED DESCRIPTION OF THE INVENTION

The waterborne copolymeric colorant is prepared by copolymerizing a reactive dye and vinyl compound in the form of an aqueous emulsion. The reactive dye, component (A), of the waterborne copolymeric colorant provides a suitable group in an alkaline medium (pH value greater than 7.0) which is capable of forming a covalent bond between a carbon atom of the dye ion or molecule and a vinyl compound. The formation of a covalent bond between the dye molecule and vinyl compound forms a waterborne copolymeric colorant. The amount of reactive dye used in preparing the waterborne copolymeric colorant is 1 to 30 weight percent, preferably 5 to 20 weight percent, and most preferably 10 to 18 weight percent, based on the total waterborne copolymeric colorant composition.

Reactive dyes are commercially available from various companies, for example, suitable reactive dyes and their structures include: LANASOL Dye —NH—OC—CH(Br)—$CH_2$Br which has the reactive group Dye —NH—CO—C(Br)=$CH_2$ and is available from Ciba-Geigy. LEVAFIX Dye —$SO_2$—NH—$CH_2$ $CH_2$ $OSO_3$ Na which has the reactive group Dye.NH CO CH=$CH_2$ and is available from Bayer. PRIMAZIN Dye NH—$COCH_2CH_2OSO_3$Na which has the structure Dye NH CO CH=$CH_2$ and is available from BASF. PROCILAN 1:2 Metal Complex Dye —NH CO $CH_2$ $CH_2$ $OSO_3$ Na which has the reactive group Dye NH CO CH=$CH_2$ and is available from ICI. REMAZOL Dye $SO_2$—$CH_2$—$CH_2$—$OSO_3$ Na which has the reactive group Dye —$SO_2$—CH=$CH_2$ and is available from Hoechst. SOLIDAZOL Dye —NH—CO—$CH_2$ $CH_2$ $SO_2C_6H_5$ which has the reactive group Dye —NH—CO—CH=$CH_2$ and is available from Cassella. By changing the dye portion of the reactive dye, one can obtain different colors without modifying the reactive groups.

Component (B) of the copolymeric colorant is a vinyl compound. The vinyl compound has a vinyl group (CH2=CH—). Examples of vinyl compounds include:

vinyl monomers such as styrene, vinyl acetate, methyl acrylate, butyl methacrylate, methyl methacrylate, butyl acrylate, ethyl acrylate, 2-ethylhexyl acrylate, acrylic acid, acrylonitrile, hydroxyethyl acrylate, hydroxyethyl methacrylate, ethylhexylacrylate, and combinations thereof. Any vinyl compound may be used provided it exhibits a positive reactivity ratio with a reactive group of the dye. The term "reactivity ratio" refers to the ratio of the rate constant for a reactive propagating species adding its own type of monomer to the rate constant for its addition of the other monomer.

The vinyl component is present in an amount of 10 to 60 weight percent, based on the total waterborne copolymeric colorant composition. Preferably, the vinyl component is present in an amount of 15 to 40 weight percent.

Component (C) of the waterborne copolymeric colorant composition is at least one anionic and/or nonionic surfactant. The surfactant has a hydrophilic-lipophilic balance (HLB) value of at least 2. Combinations of surfactants may also be used. The surfactant can be in polymeric nature with water solubility or water dispersibility. The surfactant emulsifies the vinyl component in the presence of alkaline dye. The surfactant is present in an amount of 0.1 to 10 weight percent, based on the total waterborne copolymeric colorant composition. Preferably, the surfactant is present in an amount of 0.2 to 5 weight percent.

The surfactant may be a water-soluble or water-dispersible copolymeric surfactant which includes polyesters, polyvinyl alcohol, acrylic polymers, etc. Copolymeric surfactants have a weight average molecular weight of 5,000 to 50,000, preferably 10,000 to 30,000. Several water-dispersible polyesters are available from Eastman Chemical Company under the tradename EASTMAN AQ polymers such Eastman AQ 55.

Useful surfactants are available under the trademarks: ALIPAL, IGEPAL, ABEX, TWEENS, DOWFAXS, SPANS, ARLACELS, MYRIJS, BRIGS, TERGITOLS, and POLOXAMERS. Nonpolymeric surfactants have a weight average molecular weight of 200 to 20,000, preferably 250 to 15,000. A mixture of nonionic and anionic surfactants is preferred to minimize amount of surfactant in the waterborne copolymeric colorant composition since a single surfactant may have to be used in a larger amount. The surfactant may be added to either phase of the emulsion.

Component (D) of the waterborne copolymeric colorant is an initiator. The initiator may be water-soluble or water-insoluble. Typical water soluble initiators include ammonium persulfate, sodium persulfate, potassium persulfate, while water insoluble initiators include benzoyl peroxide and 2,2-azobis(isobutyronitrile). The initiator is added in an amount of 0.01 to 0.5 weight percent, preferably 0.05 to 0.25 weight percent, based on the total weight of the waterborne copolymeric colorant composition.

Component (E) of the waterborne copolymeric colorant is water. Tap water or distilled water may be used. Distilled water is preferred. Water is added in an amount of 50 to 90 weight percent, preferably 65 to 80 weight percent, based on the total weight of the waterborne copolymeric colorant composition.

The process for preparing the copolymeric colorant of the present invention involves contacting the reactive dye, component (A), with water at a pH of greater than 7.0; adding the surfactant, component (C), which is either soluble or dispersible in the alkaline dye solution; contacting the dye solution with at least one vinyl compound, component (B). Contacting the aqueous and nonaqueous phases under agitation at an ambient temperature to result in an emulsion. Approximately ⅓ of the emulsion is heated to 40° C. to 80° C. The remaining emulsion and initiator solution are pumped into the reactor over a period of 1.5 to 3.5 hours. The emulsion is polymerized at a temperature of 40° C. to 80° C., preferably 50° C. to 75° C. to form a waterborne copolymeric colorant dispersion.

The copolymeric colorant dispersions are allowed to cool. After cooling, the copolymeric colorant dispersions are filtered. The waterborne copolymeric colorant can be dried by such methods as spray drying, freeze drying, and air drying to form a water-dispersible powder. The copolymeric colorant powder can be re-dispersed just prior to its incorporation in waterborne formulations.

The particle size of the dried copolymeric colorant powder is 25 to 500 nM, preferably 40 to 400 nM, and most preferably 20 to 200 nM. Pigment particle size is one of the important factors which determine the color strength of the pigment. As the particle size is reduced, color strength is increased to a maximum value. For particle sizes greater than about 0.5 micron, color strength is inversely proportional to particle diameter, and is approximately independent of refractive index of the particle relative to the medium and the absorption coefficient of the pigment. Thus, particle size of the colorant is of considerable importance to the utility and value of pigments.

Any substrate such as paper, metal, plastic, and fibers can be coated and colored using the waterborne copolymeric colorants of the present invention. The dye which becomes covalently bonded in the polymer backbone, is not extractable, exudable, leachable or sublimable from the polymer.

The following examples will further illustrate practice of the invention, but should not be interpreted as a limitation thereon.

EXAMPLE 1

This example illustrates the preparation of a waterborne copolymeric colorant having the following ingredients:

| Ingredients | Amount (g) | (%) |
|---|---|---|
| Remazol Gold Yellow RNL Dye (Hoechst Celanese Corp) | 5.00 | 2.70 |
| Methyl methacrylate (Aldrich Co.) | 40.00 | 21.54 |
| AQ-55 (30% Dispersion) | 40.00 | 21.54 |
| Alipal CO-436 Surfactant (GAF) | 0.34 | 0.18 |
| Igepal CO-210 Surfactant (GAF) | 0.34 | 0.18 |
| Aqueous Alkaline Soln. (0.3% NaOH) | 100.00 | 53.86 |

The waterborne copolymeric colorant was prepared as follows:

1. Remazol dye was dissolved in an aqueous alkaline solution to produce the vinyl sulfonyl groups for emulsion polymerization.

Dye. $SO_2-CH_2-CH_2OSO_3Na + NaOH \rightarrow Dye. SO_2CH=CH_2 + Na_2SO_4 - H_2O$ 2. All ingredients were mixed together except methyl methacrylate using a stirring device. An emulsion was prepared by adding methyl methacrylate to the aqueous solution under mild agitation at a temperature of 25° C.

3. The emulsion was poured in a reactor containing nitrogen gas environment and heated to 70° C. while continuously stirring the emulsion.

4. At 70° C. an initiator (50 grams of 0.5% ammonium persulfate solution in $H_2O$) was pumped in the reactor over two hours with stirring.

5. After adding initiator, the 70° C. temperature was maintained for one additional hour while continuous mixing to complete the dye polymerization.

6. The aqueous copolymeric colorant dispersion was allowed to cool, filtered and stored in a container.

The aqueous copolymeric colorant dispersion was stable, and no settling was observed after several weeks. The aqueous copolymeric colorant was characterized as follows:

| Measured Parameters | Data |
|---|---|
| pH | 5.24 |
| % Solid Content | 31.39 |
| Particle Size: | |
| Relative volume | Diameter (nm) |
| 10% | 111 |
| 50% | 197 |
| 99% | 562 |

EXAMPLE 2

Example 1 was repeated except that the methyl methacrylate and AQ-55 polyester dispersion mixture was added to the dye-surfactant solution during mixing with Ross Mixer to prepare an emulsion using emulsion polymerization process. A stable copolymeric colorant dispersion was obtained.

The copolymeric colorant was characterized as follows:

| Measured Parameters | Data |
|---|---|
| Solid Content | 22.38 |
| pH | 5.61 |
| Particle Size: | |
| Relative volume | Diameter |
| 10% | 58 |
| 50% | 115 |
| 99% | 397 |

COMPARISON EXAMPLE 3

Example 1 was repeated except that styrene was used instead of methylmethacrylate for the emulsion polymerization. The following ingredients were used:

| Ingredients | Amount (g) | (%) |
|---|---|---|
| Remzaol Gold Yellow RNL Dye (Hoechst Celanese Corp.) | 5.00 | 3.32 |
| Styrene (Aldrich Co.) | 35.00 | 23.23 |
| AQ-55 Dispersion (30% solid) | 10.00 | 6.66 |
| Alipal CO-436 Surfactant (GAF) | 0.34 | 0.22 |
| Igepal CO-210 Surfactant (GAF) | 0.34 | 0.22 |
| Aqueous Alkaline Solution (0.3% NaOH) | 100.00 | 66.35 |

The polymerization does not occur as determined by a % solids of 5.0%. It was found that the reactivity ratio of vinyl sulfonyl group of the reactive dye and styrene is negative, which does not favor the polymerization between vinyl sulfonyl group of dye and styrene.

EXAMPLE 4

Example 1 was repeated except that Primazin dye was used instead of Remzol dye for the emulsion polymerization. The following ingredients were used:

| Ingredients | Amount (g) | (%) |
|---|---|---|
| Primazin Brilliant Yellow GL Dye (BASF Company) | 5.00 | 2.70 |
| Methyl Methacrylate (MMA) (Aldrich Company) | 40.00 | 21.54 |
| AQ-55 Dispersion (30% Solid) | 40.00 | 21.54 |
| Alipal CO-436 (GAF) | 0.34 | 0.18 |
| Igepal CO-210 (GAF) | 0.34 | 0.18 |
| Aqueous Alkaline Solution (0.3% NaOH) | 100.00 | 53.56 |

The Primazin dye was dissolved in alkaline solution to form acrylamide groups for polymerization with MMA.

Dye. NH. CO. $CH_2$ $CH_2$ $OSO_3$ Na+NaOH

Dye. NH. CO CH=$CH_2$+$NaSO_4$+$H_2O$

The aqueous copolymeric colorant dispersion contained about 18.5% solid based on total dispersion weight. The pH of the copolymeric colorant dispersion was 5.67. The particle size of the copolymeric colorant is as follows:

| Relative Volume % | Particle Size (nm) |
|---|---|
| 10 | 167 |
| 25 | 236 |
| 50 | 346 |
| 75 | 507 |

EXAMPLE 5

Example 4 was repeated except that AQ-55 copolymeric surfactant was not incorporated in the emulsion. The following ingredients were used:

| Ingredients | Amount (g) | (%) |
|---|---|---|
| Primazin Brilliant Yellow GL Dye (BASF) | 5.00 | 3.43 |
| Methyl Methacrylate (Aldrich) | 40.00 | 27.46 |
| Alipal CO-436 (GAF) | 0.34 | 0.23 |
| Igepal CO-210 (GAF) | 0.34 | 0.23 |
| Aqueous Alkaline Solution (0.3–0 NaOH) | 100.00 | 68.65 |

The aqueous copolymeric colorant dispersion had a pH of 5.61. The average particle size of the dispersion was 437 nm as measured by light scattering technique. The dispersion was stable after several weeks.

EXAMPLE 6

Example 5 was repeated except that styrene was used instead of methyl methacrylate (MMA) in preparing the aqueous copolymeric colorant dispersion. Polymerization occurred as observed by an increase in % solid content in the dispersion. The pH of the copolymeric colorant dispersion was 4.28.

EXAMPLE 7

Example 6 was repeated except that Primazin Brilliant Blue RL dye was used instead of Primazin Brilliant Yellow GL Dye to prepare the aqueous dispersible copolymeric colorant. The copolymeric colorant dispersion was stable after several weeks. The solids content was 20 weight percent.

EXAMPLE 8

Example 1 was repeated except that Remazol Red 3BS dye was used instead of Remazol Gold Yellow RNL Dye. The following ingredients were used:

| Ingredients | Amount (g) | (%) |
| --- | --- | --- |
| Remazol Red 3BS Dye (Hoechst Celanese Corp.) | 10.00 | 6.64 |
| Methyl Methacrylate (Aldrich Co.) | 40.00 | 26.54 |
| Alipal CO-436 Surfactant (GAF) | 0.70 | 0.46 |
| Aqueous Alkaline Solution (0.3% NaOH) | 100.00 | 66.36 |

The copolymeric colorant was stable after several weeks. The solids content was 23.86 which is close to its theoretical value of 24.02 weight percent. The pH of the copolymeric colorant dispersion was 5.93.

EXAMPLE 9

Example 8 was repeated except that Remazol Navy Blue R-GB dye was used instead of Remazol Red 3BS dye for preparing an aqueous copolymeric colorant dispersion. The following ingredients were used:

| Ingredients | Amount (g) | (%) |
| --- | --- | --- |
| Remazol Navy Blue R-GB Dye (Hoechst Celanese Corp.) | 10.00 | 6.64 |
| Methyl Methacrylate (Aldrich Co.) | 40.00 | 26.54 |
| Alipal CO-436 Surfactant (GAF) | 0.35 | 0.23 |
| Igepal CO-210 Surfactant (GAF) | 0.35 | 0.23 |
| Aqueous Alkaline Solution (0.3% NaOH) | 100.00 | 66.36 |

A stable dispersion of copolymeric colorant was obtained using emulsion polymerization process. The dispersion was air dried to obtain copolymeric colorant in the powder form. The particle size of the dried powder was in the range of 45 to 450 nM. The dried copolymeric colorant was easily re-dispersible in water under mild agitation.

EXAMPLE 10

Example 6 was repeated except that Primazin Brilliant Black BN Dye was used instead of Primazin Brilliant Yellow GL Dye for preparing aqueous dispersible copolymeric colorant. The following ingredients were used:

| Ingredients | Amount (g) | (%) |
| --- | --- | --- |
| Primazin Brilliant Black BN Dye (BASF) | 10.00 | 6.64 |
| Styrene (Aldrich) | 40.00 | 26.55 |
| Alipal CO-436 Surfactant (GAF) | 0.34 | 0.23 |
| Igepal CO-210 (GAF) | 0.34 | 0.23 |
| Aqueous Alkaline Solution (0.3% NaOH) | 100.00 | 66.35 |

A stable copolymeric colorant dispersion was prepared using emulsion polymerization process. The dried copolymeric colorant was easily re-dispersible in water under mild agitation.

EXAMPLE 11

Example 10 was repeated except that Primazin Brilliant Red 3S dye was used instead of Primazin Brilliant Black BN dye for preparing aqueous dispersion of copolymeric colorant. The % solid was determined to be 22.0% which is also the theoretical value. The copolymeric dispersions were stable for several weeks. The average particle size was in the range of 180 to 230 nm. The pH of the copolymeric colorant dispersion was in the range of 7.85 to 8.15.

EXAMPLE 12

This example illustrates that the dye is covalently bonded to the polymer backbone. The water-dispersible copolymeric colorant of Examples 7 and 10 were analyzed by Gel Permeation Chromatographic (GPC) method using a refractive index detector for chromatograph and a visible light detector to detect the dye. The chromatographs show peaks for the acrylamide and the visible spectrum shows peaks for the dye at corresponding wavelengths. When these two sets of chromatographs are overlaid upon each other, correcting for the difference in response time by matching up the toluene marker peaks, the results show that the dye is copolymerized as these peaks are at relatively high molecular weights compared to what would be expected to be found for the dye alone.

EXAMPLE 13

The waterborne colorants prepared according to the process of this invention were used to form a film on paper. In order to adjust color strength, a water-dispersible polyester or acrylic emulsion was added to the colorant dispersions. It was observed that the copolymeric colorant formed a glossy, color, smooth film on several paper substitutes. The gloss at 60° was in the range of 40 to 85 depending on the substrate on which the film was formed.

EXAMPLE 14

The coated paper film of Example 13 was used for color fastness or for diffusion of colorant in an aqueous medium. A 4"×2" piece of coated paper was immersed in water. The coated paper was examined for color diffusion and color fastness. It was observed that the gloss and color fastness (color strength) remain the same for coated paper before and after immersion in water. Results also demonstrate that the dye does not leach to the aqueous medium as it is covalently bonded with the polymer backbone.

The copolymeric colorants can be incorporated in various waterborne formulations as pigments. These copolymeric colorants provide superior performance as compared to the formulations contained dyes which are not copolymeric in nature.

Many variations will suggest themselves to those skilled in this art in light of the above detailed description. All such obvious modifications are within the full intended scope of the appended claims.

What is claimed is:

1. A waterborne copolymeric colorant composition consisting essentially of:
   (A) 1 to 30 weight percent of at least one reactive dye in alkaline solution;
   (B) 10 to 60 weight percent of at least one vinyl compound which copolymerize with the reactive dye in an alkaline medium to form the copolymeric colorant;
   (C) 0.1 to 10 weight percent of at least one anionic or nonionic surfactant;

(D) 0.01 to 0.5 weight percent of an initiator; and (E) 50 to 90 weight percent of water, provided the copolymeric colorant composition has a solids content of 10 to 50 weight percent.

2. A waterborne copolymeric colorant composition consisting essentially of:

(A) 5 to 20 weight percent of at least one reactive dye in alkaline solution;

(B) 15 to 40 weight percent of at least one vinyl compound which copolymerize with the reactive dye in an alkaline medium to form the copolymeric colorant;

(C) 0.2 to 5 weight percent of at least one anionic or nonionic surfactant;

(D) 0.05 to 0.25 weight percent of an initiator; and (E) 65 to 80 weight percent of water, provided the copolymeric colorant composition has a solids content of 15 to 40 weight percent.

3. The waterborne copolymeric colorant composition of claim 1 wherein the reactive dye is present in an amount of 10 to 18 weight percent based on the total waterborne copolymeric colorant composition.

4. The waterborne copolymeric colorant composition of claim 1 wherein the vinyl compound is selected from the group consisting of styrene, vinyl acetate, methyl acrylate, butyl methacrylate, butyl acrylate, ethyl acrylate, 2-ethylhexyl acrylate, acrylic acid, hydroxyethyl acrylate, hydroxyethyl methacrylate, ethylhexylacrylate, and combinations thereof.

5. A method for preparing a waterborne copolymeric colorant comprising the steps of:

(I) preparing an alkaline solution of a reactive dye;

(II) emulsifying the alkaline solution of the reactive dye prepared in Step (I) with at least one vinyl compound in the presence of at least one anionic or nonionic surfactant; and (III) polymerizing the emulsion prepared in Step (II) in the presence of an initiator at a temperature of 40° C. to 80° C. to form a waterborne copolymeric colorant.

6. The method of claim 5 further comprising the step of drying the copolymeric colorant to form a water-dispersible powder.

7. The method of claim 6 wherein the water-dispersible powder has a particle size in the range of 25 to 500 nM.

* * * * *